UNITED STATES PATENT OFFICE.

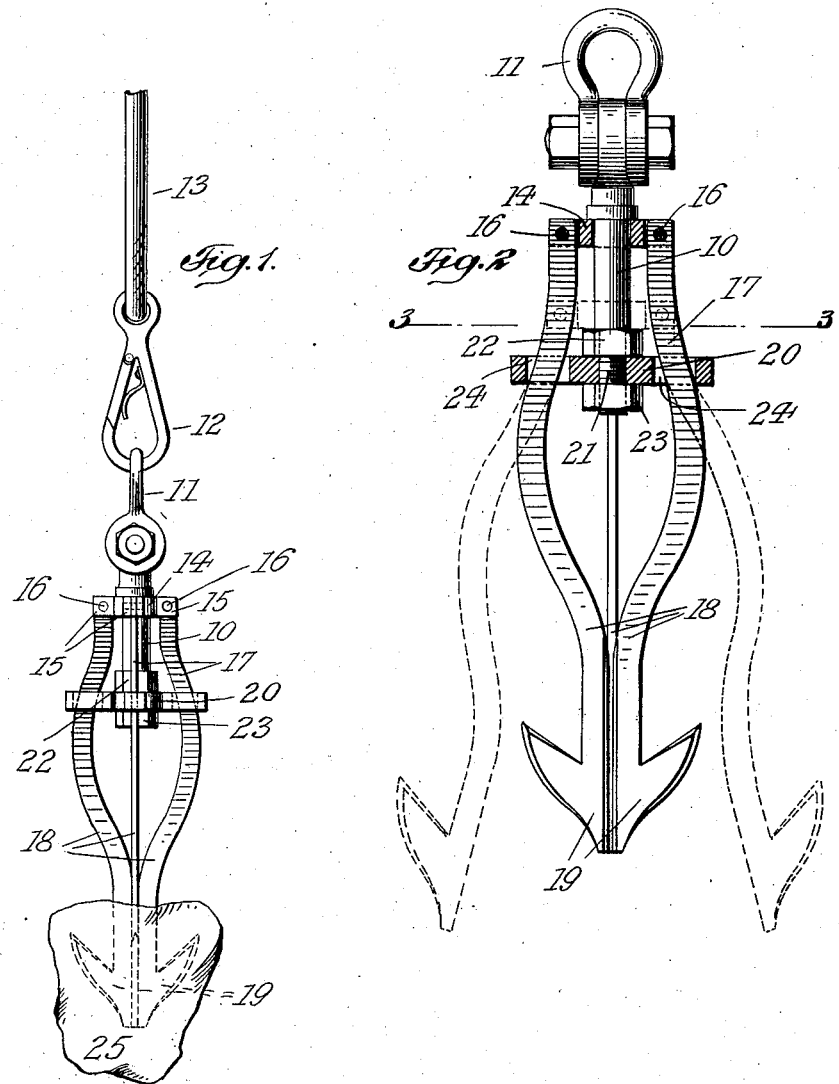

ADAM SCHRAMM, OF WEEHAWKEN, NEW JERSEY.

ANIMAL-TRAP.

1,021,428.  Specification of Letters Patent.  Patented Mar. 26, 1912.

Application filed September 19, 1911. Serial No. 650,083.

*To all whom it may concern:*

Be it known that I, ADAM SCHRAMM, a citizen of the United States, residing at Weehawken, county of Hudson, and State of New Jersey, have invented a new and Improved Animal-Trap, of which the following is a specification.

This invention relates to a trap for foxes and other wild animals, which will quickly kill the same in a merciful manner and without in any way damaging their pelt.

In the accompanying drawing: Figure 1 is a side view of an animal trap embodying my invention; Fig. 2 a side view partly in section thereof, taken at right angles to Fig. 1, and Fig. 3 a cross section on line 3—3, Fig. 2.

The trap is adapted to be suspended from a branch at such a distance above the ground that the bait attached to the trap is within reach of a jumping animal.

The device comprises a vertical guide stem 10, to the upper end of which is pivoted a swivel eye 11 which may be engaged by a snap hook 12. This hook is secured to the end of a rope 13 which serves to attach the trap to a branch or other overhead support. Stem 10 is encompassed by a slide 14 provided with a plurality of radially projecting arms 15. To each arm is pivoted at 16, a foldable jaw composed of a shank having a curved upper section 17, a lower inwardly extending neck 18 and a head 19 carried by the neck. Each head 19 has an upper barb and tapers gradually from said barb downwardly and inwardly toward its lower end, so as to here run out into a point. The lower pointed ends of the several heads will, when the heads are drawn together, form collectively a single downwardly extending prong upon which the bait is adapted to be speared. The shanks extend a considerable distance below the lower end of stem 10, so that the necks of the several jaws are adapted to contact with each other when slide 14 is in its raised position. To the lower end of stem 10, there is secured a fixed guide 20, the configuration of which corresponds substantially to that of slide 14. Thus with the cruciform slide shown, the guide is also cruciform, its arms being however slightly longer than those of the slide. Guide 20 is centrally apertured to accommodate a threaded pin 21 depending from stem 10 and carrying a pair of nuts 22, 23 between which the guide is confined. The upper nut 22 constitutes at the same time, an abutment which limits the downward play of the slide, while by unscrewing both nuts, the slide may be slipped over the lower end of the pin during the assemblage of the parts. Each arm of guide 20 is vertically alined with the corresponding arm of slide 14 and is slotted as at 24 to accommodate the shank of the jaw pivoted to said arm. The correlation of the parts is such that the distance between the axis of stem 10 and the inner edge of any one slot 24 is greater than the distance between said axis and the upper ends of jaws 16.

In use, the device is suspended from an overhead support in the manner previously described, the jaws are drawn together to raise the slide and a bait 25 is secured to heads 19 (Fig. 1). This bait may be either speared on the heads or it may be wound around the necks 18, so as to loosely tie the jaws together. An animal scenting or seeing the bait and jumping for the same, will become impaled on the heads 19, which under the weight of the quarry will draw down slide 14 until stopped by nut 22. During this movement of the slide, the jaws will rapidly spread, owing to their engagement with the fixed guide 20. In this way the barbed heads 19 will become embedded in the animal's mouth, force the same open and hold it in its open position, so that breathing will be hindered and the animal will die rapidly, while remaining suspended. It will be seen that my trap is reliable in its operation, does not subject the animal to prolonged suffering and does not in any way injure the pelt.

I claim:

An animal trap comprising a stem, means for suspending the same from an overhead support, a slide movable on the stem, a plurality of jaws pivoted to the slide, each jaw being composed of a curved shank and of a head carried by said shank and provided with an outwardly extending upper barb and with an inwardly and downwardly extending outer edge below said barb to form a lower point with the inner edge, and a fixed slotted guide carried by the stem and encompassing the jaws, the guide slots being arranged at greater radial distance from the stem than the upper ends of the shanks, the lower tapering and pointed ends of the several heads forming collectively a single axial prong when the jaws are drawn together, upon which the bait is adapted to be speared.

ADAM SCHRAMM.

Witnesses:
 ARTHUR E. ZUMPE,
 KATHERYNE KOCH.

Copies of this patent may be obtained for five cents each, by addressing the "Commissioner of Patents, Washington, D. C."